United States Patent Office 3,632,681
Patented Jan. 4, 1972

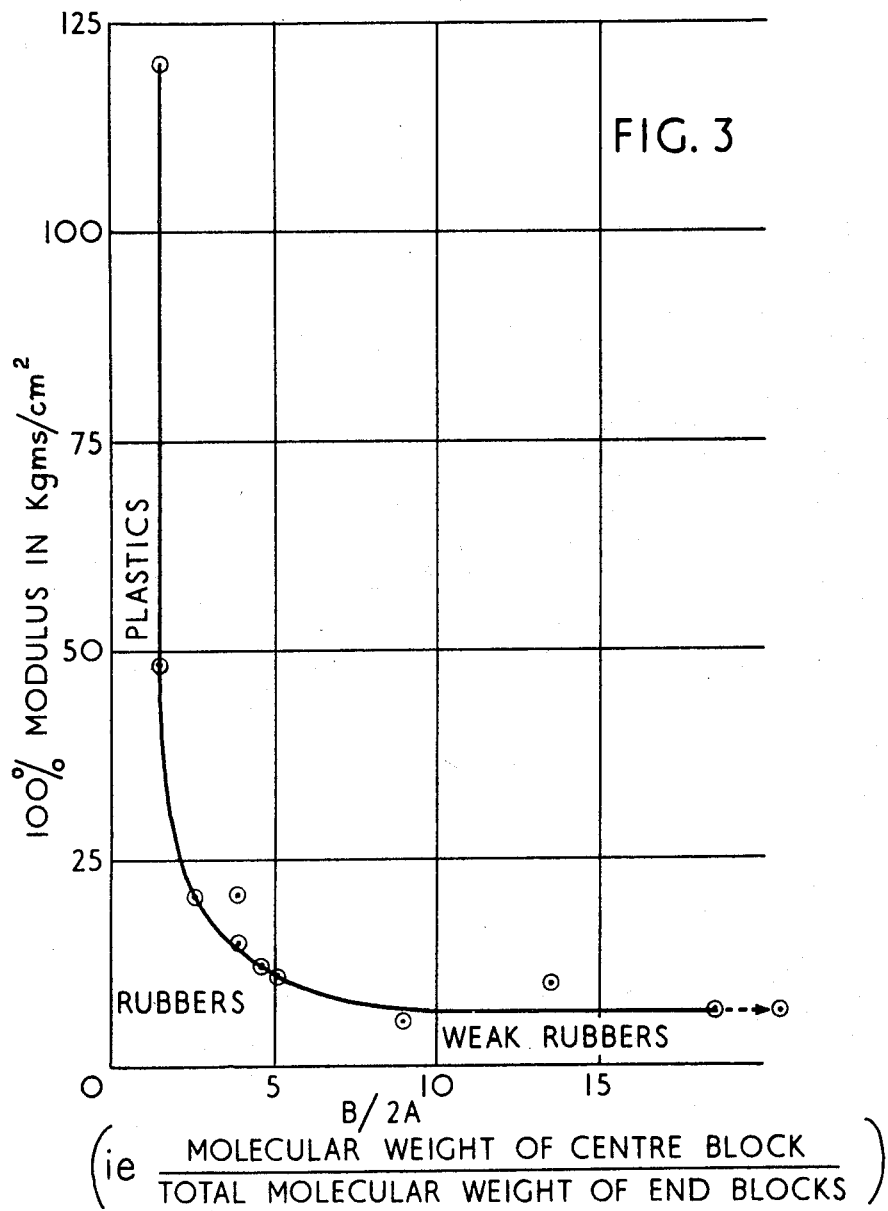

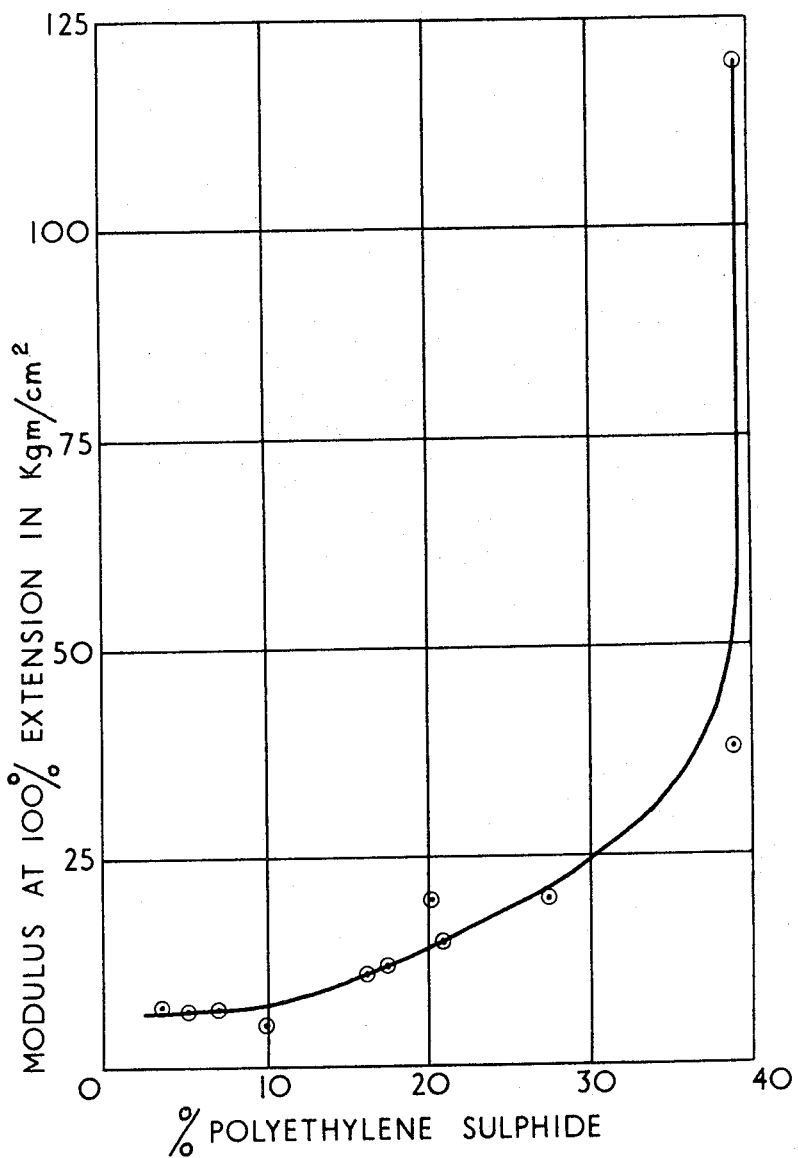

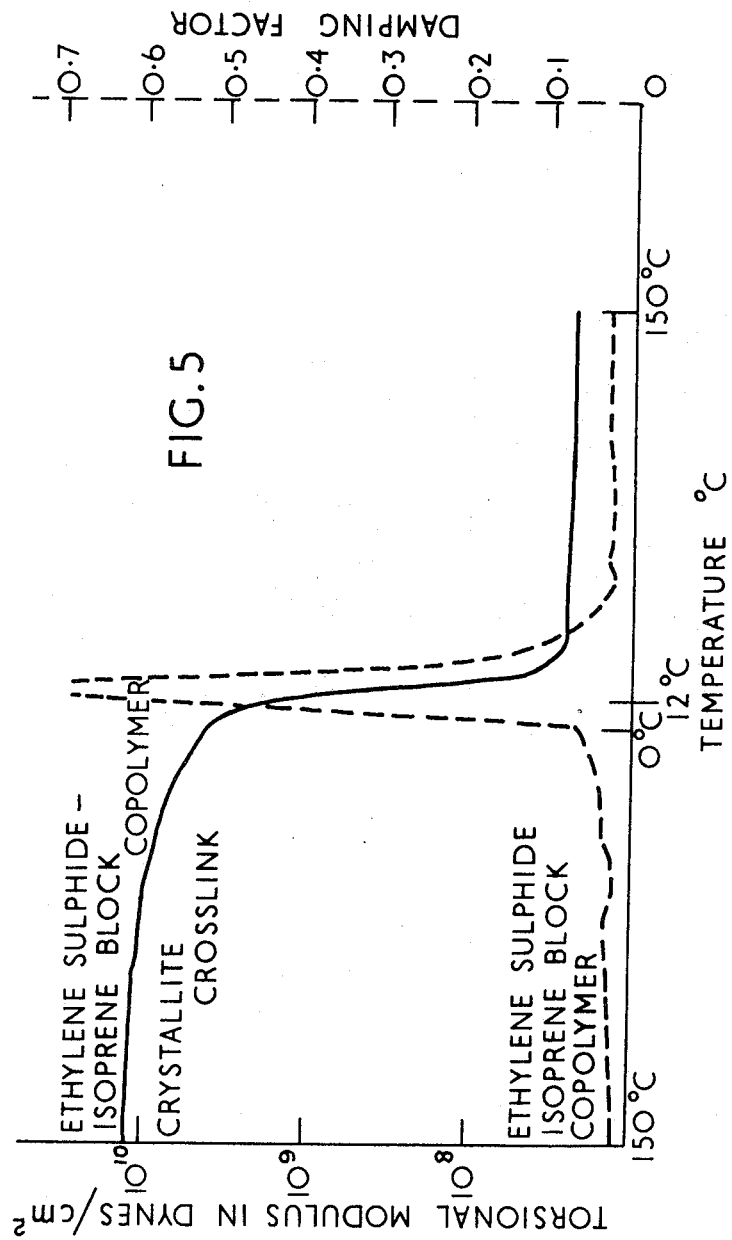

3,632,681
BLOCK COPOLYMERS COMPRISING AN N-PHENYL MALEIMIDE AND EITHER A DI-OLEFIN OR CYCLIC OXIDE
George A. Pope, Erdington, Birmingham, and George Vaughan and Paul I. Wilson, Sutton Coldfield, England, assignors to The Dunlop Company Limited, London, England
Filed May 4, 1967, Ser. No. 636,123
Claims priority, application Great Britain, May 13, 1966, 21,238/66
Int. Cl. C08d 3/06; C08f 25/00, 17/00
U.S. Cl. 260—879  12 Claims

ABSTRACT OF THE DISCLOSURE

A block copolymer having the general formula $$A—(B—A)_n$$

Figure 1:
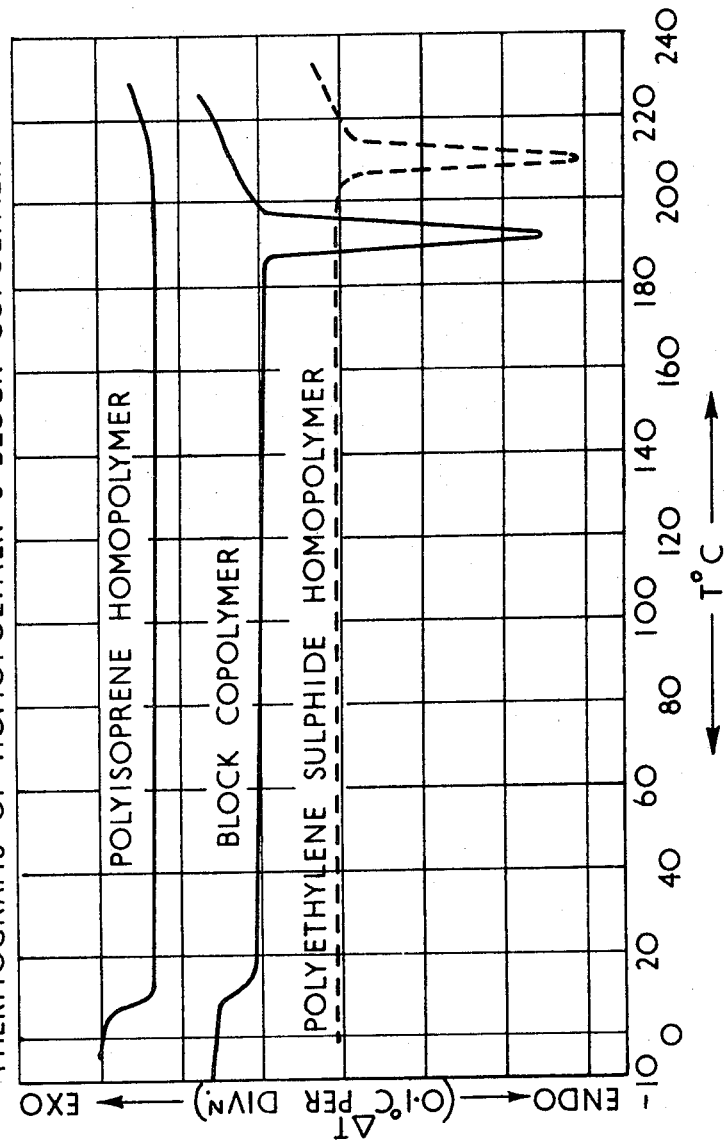

in which A represents a crystalline polymer block having a melting point above 100° C. and the total amount of polymer block A is from 3 percent to 30 percent by weight of the block copolymer and in which B represents an amorphous polymer block having a glass transition temperature not greater than 15° C. and has a viscosity average molecular weight of 10,000 to 600,000 and $n$ is an integer of from 1 to 5.

---

This invention relates to block copolymers, particularly to block copolymers having elastomeric properties.

According to the present invention, a block copolymer has the general formula $A—(B—A)_n$ wherein A represents a crystalline polymer block having a melting point greater than 100° C. and the total amount of polymer block A is from 3 percent to 30 percent by weight of the block copolymer and wherein B represents an amorphous polymer block having a glass-transition temperature of up to 15° C. and a viscosity average molecular weight of 10,000 to 600,000 and $n$ is an integer of from 1 to 5.

The preferred method for the preparation of a block copolymer according to the immediately-preceding paragraph comprises polymerizing sufficient monomer or mixture of monomers to give rise to a polymer block B in the presence of a polymerization catalyst which effects polymerization of the monomer or mixture of monomers in both directions along the polymer chain to produce a polymer block B having the required molecular weight, if necessary removing any excess monomer or monomers, adding a second monomer or mixture of monomers to the polymerization reaction mixture and effecting polymerization of these monomers to form the polymer blocks A on the previously formed polymer block B and, if desired, polymerizing further monomer or mixture of monomers to produce a further polymer block B and further monomer or mixture of monomers to produce a further polymer block A to build up the desired structure of the block copolymer.

The block copolymers of the present invention are elastomers but also are thermoplastic. The block copolymers have dimensional stability. The block copolymers can be moulded and re-moulded at will and possess excellent elastomeric properties when in the solid state at temperatures below the melting point of A blocks. The block copolymers as produced can be in admixture with, say, a copolymer having the structure A—B and/or homopolymers of A or B. In such a case it is not necessary to take any steps to reduce the quantity of other polymers provided these are present in minor proportions but it is preferred that the amount of the block copolymer according to the invention is at least 80 percent by weight of the total weight of the polymer produced.

The preferred block copolymers of the present invention have the structure wherein $n$ represents an integer having a value of 1. The polymer block A is a crystalline polymer block having a melting point (or first-order transition temperature) greater than 100° C. when determined, for example, by Differential Thermal Analysis at a heating rate of 20° C. per minute. Other techniques for verifying that A has a crystalline structure with a melting point above 100° C. are also available, such as the retention of crystalline X-ray diffraction patterns up to a temperature of 100° C., or the retention of absorption bands due to crystallinity in the Infra-Red absorption spectra at temperatures up to 100° C. Other techniques will be apparent to those skilled in the art. Polymer block A is a crystalline polymer block and is prepared from monomers which give rise to such crystalline properties as defined by having a melting point in excess of 100° C. Typical monomers from which polymer block A can be prepared are alkylene episulphides, e.g. ethylene sulphide; N-phenyl maleimide; acrylonitrile; methacrylonitrile; olefines such as ethylene or polypropylene which is polymerized to give the isotactic polymer. Polymer block A can be either a homopolymer or a copolymer provided this does not reduce the melting point of the block to not greater than 100° C. Also, polymer block A can be a crystalline polymer such as a polycarbonate, a polyurethane, a polyurea, a polyamide or a polyester such as those formed by condensation polymerizations or by the polymerization of lactams or lactones, e.g. polycaprolactam.

The total amount of crystalline polymer block A in the block copolymer is from 3 percent to 30 percent by weight, preferably 10 percent to 25 percent by weight. Preferably, where the block copolymer contains only two polymer blocks A then the total amount of polymer block A in the block copolymer should be divided substantially equally between the two polymer blocks.

The polymer block B is the elastomeric portion of the block copolymer and is an amorphous elastomeric polymer block having a glass-transition temperature (second-order transition temperature) of less than 15° C. when determined by, for example, Differential Thermal Analysis or dilatometric measurements at a heating rate of up to 20° C. per minute. The polymer block B may be a homopolymer or copolymer and can be prepared from any monomer or mixture of monomers which give rise to the desired properties and such monomers are diolefines such as isoprene or butadiene or their substituted derivatives; cyclic sulphides such as propylene sulphide; cyclic oxides such as propylene oxide and tetrahydrofuran; or mixtures of copolymerizable monomers such as butadiene and styrene, isoprene and styrene, ethylene sulphide and propylene sulphide and ethylene and propylene. Preferably, the polymer block B has a second-order transition temperature below 0° C.

The polymer block B should have a viscosity average molecular weight of 10,000 to 600,000 as measured, e.g. by polymerizing a polymer block B independently of polymer block A and then determining the intrinsic viscosity in a dilute solution. Preferably, the polymer block B has a molecular weight in the range 20,000 to 200,000. The particular relationship between the intrinsic viscosity and the molecular weight depends on the nature of the particular polymer block B and on the particular solvent and temperature used but the relationships are well-known or can be easily ascertained. Typical equations relating intrinsic viscosity to molecular weight are given below:

(1) For a high 3,4-content polyisoprene, intrinsic viscosity $_{\text{benzene}}^{30° \text{C.}} = 1.11 \times 10^{-4} (\overline{M})^{0.74}$ (2) For a high cis-1,4-content polyisoprene, intrinsic viscosity $_{\text{toluene}}^{25° \text{C.}} = 5 \times 10^{-4} (\overline{M})^{0.66}$ (3) For a polybutadiene of mixed microstructure (40 percent to 56 percent cis-1,4- and 50 percent to 30 percent trans-1,4- and 5 percent to 15 percent 1,2-), intrinsic viscosity $_{\text{benzene}}^{25° \text{C.}} = 1.45 \times 10^{-4} (\overline{M})^{0.76}$ wherein $\overline{M}$ is the average molecular weight.

The block copolymers of the present invention can be manufactured in a number of ways which will be well-known to those skilled in the art, but a particularly useful manner is to polymerize the polymer block B using a polymerization catalyst that is effective in polymerizing the monomer or mixture of monomers so that the polymer block B as it forms is extended in both directions along the polymer chain concurrently. Usually, sufficient monomer is employed to give the required molecular weight when all the monomer has been polymerized. The monomer or mixture of monomers which are to form the polymer blocks A are then added to the polymerization reaction mixture and polymerization effected. The catalysts that are employed are preferably those which give long-lived catalyst species such as those formed from the alkali metals, lithium, sodium, potassium, caesium and rubidium; alkali metal alloys; alkali metal compounds such as dilithiobutane, dilithiopentane, dilithiodiphenyl, dilithio alpha-methylstyrene (dimer, trimer or tetramer), and alkali metal complexes such as sodium naphthalene and lithium naphthalene, and similar compounds from the above-mentioned alkali metals.

An alternative method of preparing the block copolymers in which $n$ has a value of 1 is to polymerize, firstly, a monomer or mixture of monomers to form block A of the desired characteristics, then to introduce the monomer or mixture of monomers to form block B of the desired molecular weight and, finally, complete formation of the block copolymer by polymerizing a further amount of the first monomer. If a block copolymer is desired in which $n$ has a value greater than 1 then the process of sequential polymerization is repeated until the desired structure is built up. The catalysts employed for this type of method still require to be long-lived but do not have to give difunctional catalyst species. Suitable catalysts are alkali metal, alkyl or aryl compounds such as butyl lithium, and certain Ziegler-Natta catalysts such as, e.g., titanium trichloride/aluminium alkyl and titanium tetrachloride/lithium aluminium heptyl.

The block copolymers of the present invention can be used for a wide variety of applications where conventionally vulcanized elastomers are currently used such as, for example, tyres, inner tubes, belts, hoses, tubing, sheeting, flooring, wire and cable coverings, footwear, sponges coated fabrics, surface coatings and a wide variety of other coated and moulded articles. Many are suitable for moulding by compression, extrusion or injection and many can be processed in solution. A significant advantage to be gained from their use is that waste material or damaged mouldings can be re-processed without difficulty.

The invention will now be illustrated in the following examples.

In the following examples, abbreviations are used and an index to such abbreviations is as follows:

EN=Experiment number.
SA=Sodium azide (amount in grammes)
IA=Amount of isoprene (grammes)
EA=Amount of ethylene sulphide (grammes)
Y=Yield (expressed as a percentage)
I=Molecular weight of block of isoprene in polymer.
%E=Percentage by weight of ethylene sulphide in block copolymer
%S=Percentage by weight of the polymer that is soluble in benzene
TS=Tensile strength (kilogrammes per square centimetre)
EB=Percentage elongation at break
100M=Modulus at 100 percent elongation (kilogrammes per square centimetre)
200M=Modulus at 200 percent elongation (kilogrammes per square centimetre)
HR100=Hysteresis recovery from 100 percent extension
HR200=Hysteresis recovery from 200 percent extension
IIA=Amount of isoprene added initially to form the initiating species (ml.)
LD=Amount of lithium dispersion (grammes)
NPM=Amount of N-phenyl maleimide (grammes)
%NPM=Percentage by weight of N-phenyl maleimide in the block copolymer
V=Intrinsic viscosity
MP=Melting point (° C.)
Tg=Glass (second-order) transition temperature (° C.)

EXAMPLE I

This example illustrates the preparation of various block copolymers prepared from ethylene sulphide and isoprene.

The general method of preparation was as follows.

All operations were carried out under vacuo or in an inert atmosphere. The polymerization catalyst was prepared by heating a known amount of sodium azide to decompose it into sodium (in EN.1 sodium metal was used directly) and then adding a solution of naphthalene in tetrahydrofuran to form the complex sodium naphthalene. The catalyst solution so prepared was maintained at $-10°$ C. and to this isoprene in a known amount was added. Polymerization was allowed to proceed to completion over a period of from 3 to 4 hours. Ethylene sulphide was then added, thoroughly mixed with the polymerization reaction mixture and the temperature of the mixture was allowed to rise to ambient temperature.

The typical orange-red colour associated with polyisoprenyl anions in tetrahydrofuran rapidly faded to give a colourless reaction mixture. This colour change was accompanied by a marked increase in the viscosity of the mixture leading ultimately to a "gelled" mass (due to the crystallization from solution of the ethylene sulphide end blocks). Polymerization of the ethylene sulphide was continued for 12 hours so that it was essentially complete. The polymerization was terminated by the addition of methanol, containing antioxidant (0.5 percent to 1 percent on polymer), the solvent evaporated and the polymer finally dried on a warm mill.

Table I gives the experimental details of a number of polymerization experiments and Table II the properties of the polymers produced. The polymers were pressed in sheets (1 mm. thickness) at a temperature above 190° C., dumb-bells (5×0.254 cm.; square ended) were cut from the sheets, and the physical properties were determined using an Instron tester.

TABLE I

| EN | SA | IA | EA | Y | I×10⁻⁵ | %E | %S |
|---|---|---|---|---|---|---|---|
| 1 | [1] 0.0313 | 12.2 | 0.63 | 100 | 0.18 | 3.4 | |
| 2 | 0.0226 | 13.9 | 1.0 | 100 | 5.45 | 5.1 | 19.0 |
| 3 | 0.032 | 14.8 | 1.5 | | 2.64 | 7.0 | |
| 4 | 0.037 | 11.4 | 1.8 | 100 | 1.12 | 10.0 | |
| 5 | 0.0283 | 17.8 | 3.7 | 94 | 5.45 | 16.2 | 11.4 |
| 6 | 0.0284 | 13.1 | 3.5 | 100 | 2.64 | 17.6 | 17.5 |
| 7 | 0.0286 | 17.6 | 5.7 | 95 | 5.45 | 20.2 | |
| 8 | 0.0382 | 5.9 | 1.8 | 92 | 0.68 | 20.9 | 11.8 |
| 9 | 0.0296 | 9.1 | 3.6 | 100 | 1.12 | 27.6 | 10.1 |
| 10 | 0.0276 | 8.5 | 5.8 | 94 | 1.12 | 38.7 | 16.6 |
| 11 | 0.088 | 13.5 | 10.8 | 95 | 0.68 | 38.7 | 7.7 |

[1] Sodium metal (Na) used directly.

TABLE II

| EN | TS | EB | 100M | 200M | HR100 | HR200 |
|---|---|---|---|---|---|---|
| 1 | 47.7 | 550 | 7.2 | 11.6 | 100 | 98 |
| 2 | 54.5 | 780 | 6.7 | 11 | 100 | 100 |
| 3 | 66.8 | 750 | 7.0 | 16 | 99 | 97 |
| 4 | 100 | 660 | 5.0 | 100 | 100 | 100 |
| 5 | 168 | 600 | 11.0 | 20 | 99 | 98 |
| 6 | 146 | 450 | 12.0 | 32 | 99 | 96 |
| 7 | 147 | 700 | 20.0 | 33 | 98 | 96 |
| 8 | 114 | 490 | 15.1 | 37 | 100 | 97 |
| 9 | 147 | 500 | 20.0 | 54 | 99 | 95 |
| 10 | 159 | 265 | 38 | 91 | 97 | 86 |
| 11 | 173 | 210 | 120 | 170 | 87 | |

In making the hysteresis measurements the samples were extended by the stated amount at the rate of 10 inches per minute, the instrument reversed to the starting position at the same rate and the polymer allowed to relax for 3 minutes. This extension/relaxation process was repeated three times and the recovery of the polymer was then measured. Results are given in Table II. The behaviour of the polymer on heating was analysed using a Du Pont thermal analyser.

Figure 2:
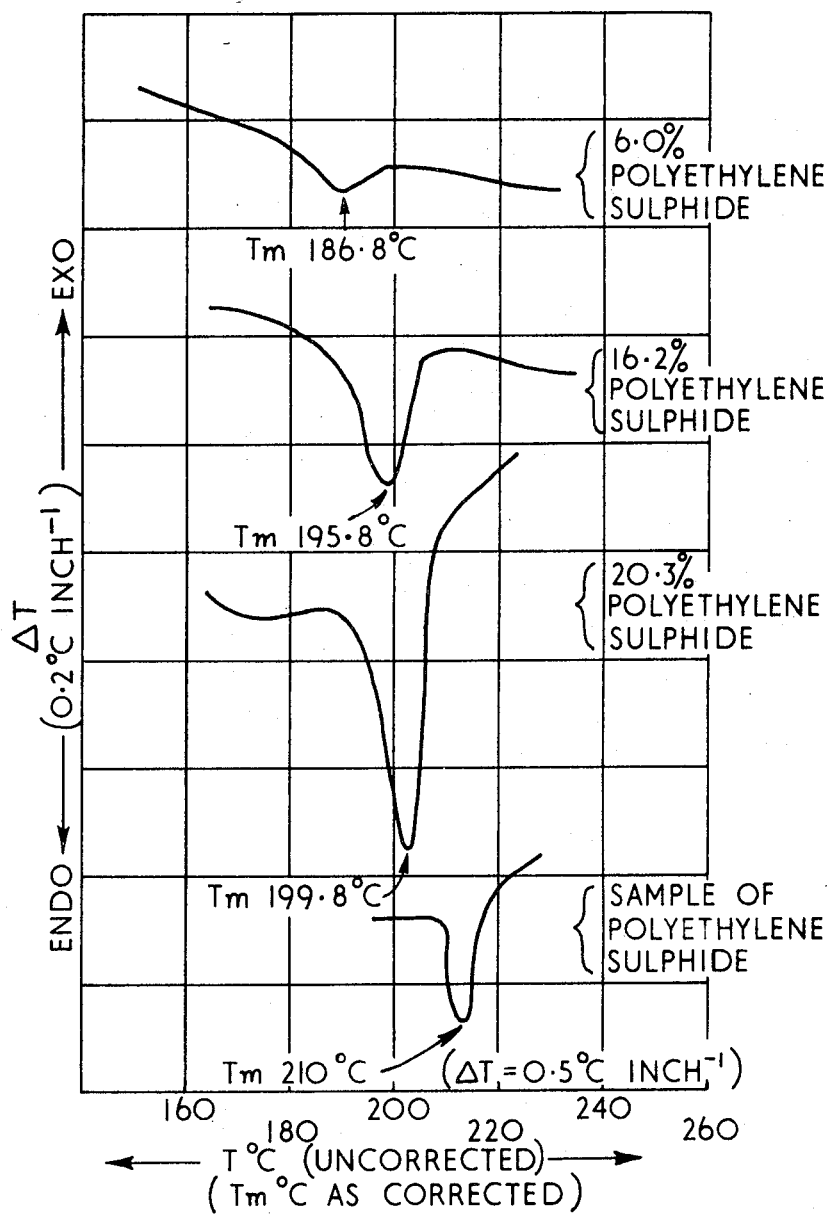

Some of the properties of the polymers are demonstrated in more detail in the accompanying drawings, in which:

FIG. 1 shows a typical differential thermogram for a polyisoprene/poly(ethylene sulphide) block copolymer of this invention and, for comparison, the thermograms obtained from homopolymers of isoprene and of ethylene sulphide prepared using the sodium naphthalene catalysts under the same conditions as above, FIG. 2 shows the melting point curves for three polyisoprene/poly(ethylene sulphide) block copolymers of this invention in which the molecular weight of the B (polyisoprene) block is constant but the molecular weight of the A (poly-(ethylene sulphide)) blocks is increased. The melting point curve of poly(ethylene sulphide) homopolymer is included for comparison, FIG. 3 is a plot of modulus at 100 percent extension against the ratio of the molecular weight of the B block to the total molecular weight of the A blocks (i.e. $B/2A$) over the series of polyisoprene/poly(ethylene sulphide) block copolymers of varying composition given in Tables I and II.

FIG. 4 is a plot of modulus at 100 percent extension against the poly(ethylene sulphide) content by weight for the series of block copolymers used for FIG. 3, and FIG. 5 shows the variation in Torsional Modulus and also in the Damping Factor of a polyisoprene/poly(ethylene sulphide) block copolymer of this invention.

From FIG. 1 it can be seen that the block copolymer has a first-order transition temperature corresponding to the crystalline melting point of the ethylene sulphide polymer block and also a second-order (glass) transition temperature corresponding to that of the amorphous isoprene polymer block. The polymeric sequencies B and A are behaving almost independently so that the second-order transition in the B block and the first-order transition of the A blocks are little influenced by the presence of the other block in the same molecule. Thus, the melting point of the crystalline A blocks is maintained at a high level when the A blocks form only 6 percent by weight of the block copolymer as illustrated in FIG. 2.

From FIGS. 3 and 4 it can be seen that the stress/strain properties of the block copolymers vary markedly with the composition of the polymer (i.e. the relative properties of B and A blocks). Where the polymer is largely formed of A blocks then the stress/strain characteristics are those of a plastic whereas where the polymer is largely formed of B blocks then the stress/strain characteristics are those of a weak rubber. However, it may also be seen from FIGS. 3 and 4 that over a range of compositions between the two extremes the block copolymers have stress/strain characteristics similar to those of a strong rubber.

From FIG. 5 it can be seen that the Torsional Modulus of a typical block copolymer shows negligible change over the range 10° C. to 150° C. The block copolymers of the present invention thus show excellent dimensional stability.

EXAMPLE II

Preparation of poly(ethylene sulphide)/poly(propylene sulphide) block copolymers A solution of sodium naphthalene in tetrahydrofuran (130 ml.) was prepared from sodium azide (0.0311 g.) as described in Example 1. To the solution held at −80° C. was added propylene sulphide (19.1 g., 20.25 ml.) and the mixture was allowed to polymerize for 3 hours during which time the temperature was allowed to rise to about −20° C., polymerization was complete. Ethylene sulphide (4.1 ml.) was then added over a period for 10 minutes with good mixing. After 12 hours the solution had gelled due to crystallization of the poly(ethylene sulphide) and the polymer was isolated as described in Example I. Yield of polymer 21.5 g. (94 percent theoretical). It was completely soluble in hot decalin but when pressed into sheets it showed properties characteristic of a vulcanized network. This material shows some evidence of decomposition when heated above 160° C.

EXAMPLE III

Preparation of poly(N-phenyl maleimide)/polyisoprene block copolymers

A solution of sodium naphthalene in tetrahydrofuran (40 ml.) was prepared from sodium azide 0.0245 g. as described in Example I and cooled to −80° C. Isoprene (4.5 ml.) was added and polymerized at −10° C. After 3 hours solid N-phenyl maleimide (1 g.) was dissolved in the solution causing an intensification of the red colour and a marked increase in viscosity. The polymer was isolated as described in Example I after 12 hours. The yield was 4.3 g. (100 percent theoretical) of a red polymer having the properties expected from its composition (cf. FIG. 3). With this polymer the polyisoprene segments undergo decomposition before the end crystalline blocks melt.

EXAMPLE IV

The isoprene units prepared from the sodium naphthalene catalysts are high in 3,4-content and consequently have high second-order transition temperatures. This example illustrates one method which can be used to lower the transition temperature to −50° C.

Lithium naphthalene was prepared by dissolving lithium dispersion (0.0194 g. of a dispersion of 0.247 g. lithium in 1 g. petroleum jelly) in tetrahydrofuran (30 ml.) containing naphthalene (1.5 moles/mole lithium) at room temperature. After 1 hour complexation was complete and the solution was cooled to −80° C. and isoprene (2 ml.) added. The temperature was allowed to rise to about −20° C. (from about −50° C. the orange red coloration due to polyisoprenyl anions appeared) and the mixture was stirred for 30 minutes. The solvent was then removed by distillation under vacuum over a period of 15 minutes, leaving a viscous red residue. Hexane (50 ml.) was added to the chilled residue followed by isoprene (4 ml.) and the temperature of the mixture was raised to ambient temperature with stirring when the residue dissolved to give the yellow coloration typical of polyisoprenyl anions in hydrocarbon solvent. After 1 hour the solution had become viscous and a further quantity of isoprene (7 ml.) was added; after a further 15 minutes additional isoprene (8 ml.) in hexane (100 ml.) was added and finally after another hour a further addition of isoprene (12.5 ml.) was made. This stepwise addition of isoprene was found to be necessary in order to control the reaction rate. The temperature was reduced to 0° C. and the mixture allowed to stand for 3 hours. Ethylene sulphide (1 g.) was then added as described in Example I. The yield of polymer was quantitative.

The polymer showed a second-order transition temperature in the B block of −53° C. and a first-order transition temperature in the A block of 196° C. Spectroscopic analysis indicated the structure of the centre block to be 65 percent 1,4-addition and 35 percent total 3,4- and 1,2-addition.

The material was considerably more resilient than material made from sodium naphthalene in tetrahydrofuran.

EXAMPLE V

This describes the use of dilithio alpha-methylstyrene tetramer as catalyst to give block copolymers.

Lithium dispersion (0.019 g. of the dispersion described in Example IV) was dispersed in tetrahydrofuran (40 ml.) and to it was added alpha-methylstyrene (0.2 ml.) (concentration of alpha-methylstyrene in the reaction mixture must be kept below 0.25 mole/litre) when a bright red soluble complex was formed. Addition of isoprene to this catalyst solution (the small amount of unreacted lithium was removed by filtration) gave a dilithium polyisoprenyl to each end of which was polymerized a polymer segment derived from ethylene sulphide as described in Example I.

The technique described in Example IV, i.e. of changing the solvent can equally well be applied to this catalyst so that one can adequately control the second-order transition temperature of the centre block unit.

EXAMPLE VI

Preparation of an A–B–A block copolymer from N-phenyl maleimide and isoprene

Approximately 20 ml. of tetrahydrofuran was condensed into a well dried 500 ml. reactor vessel containing a Teflon coated stirrer and allowed to come to room temperature in an atmosphere of dry argon. 0.025 g. of lithium dispersion (1 g. of dispersion contains 0.31 g. of lithium) was introduced together with 0.5 g. of naphthalene. The reaction mixture was stirred until all the lithium had dissolved to form a deep green lithium-naphthalene complex. The reactor was cooled to below −78° C. and 2 to 3 ml. of isoprene was distilled into it. On warming to room temperature with stirring the deep green colour was discharged as polymerization of the isoprene began. After 15 minutes, the tetrahydrofuran, naphthalene and any unreacted isoprene was distilled off, leaving an oily low molecular weight polymer, which was pumped down for 15 minutes.

200 ml. of dry heptane was distilled into the reactor followed by 40 ml. of isoprene, and the reactor warmed to about 40° C. with stirring. After about ½ hour a considerable increase in viscosity of the reaction mixture was evident, and polymerization was complete within 3 hours. As much heptane as possible was distilled off (about 140 ml.), and was replaced by an equal volume of dry tetrahydrofuran which slowly dissolved the polymer. A solution of 8 g. of N-phenyl maleimide in 60 ml. of tetrahydrofuran was then added and the mixture well stirred to ensure thorough mixing. The polymerization of the maleimide derivative was allowed to continue at room temperature for 16 hours. The block copolymer was recovered by pouring the reaction mixture into 500 ml. of isopropanol acidified with 2 ml. of conc. HCl and containing an antioxidant. The isopropanol was replaced twice, and the polymer subjected to prolonged evacuation to remove last traces of solvent.

This experiment was repeated using different amounts of reactants; Table III gives the experimental details of these polymerization reactants. The products are seen to be elastomeric in character.

TABLE III

| EN | LD | IA | NPM | V | %NPM | TS | EB | HR100 | HR200 |
|----|------|------|-----|------|------|------|-------|-------|-------|
| 24 | 0.026 | 27.2 | 8 | 0.93 | 9.2 | 26.6 | 1,520 | 98 | 92 |
| 25 | 0.0114 | 34 | 10 | 1.90 | 1.60 | 26.7 | 3,400 | | |

EXAMPLE VII

Preparation of block copolymers from butadiene and N-phenyl maleimide

A prepolymer was formed in a manner similar to that described in Example VI using 0.0170 g. of lithium dispersion and 3 ml. of butadiene.

After the formation of the prepolymer 200 ml. of dry heptane was distilled into the reactor to completely dissolve the prepolymer. Butadiene (30 ml.) which had been thoroughly dried by passage through alumina towers and finally over a sodium mirror was distilled into the reactor. An increase in viscosity was apparent after 30 minutes and the polymerization was allowed to proceed for 2 hours. A further 20 ml. of butadiene was distilled into the reactor and polymerization again continued at room temperature for 3 hours. The heptane was removed and tetrahydrofuran (ca. 150 ml.) added to re-dissolve the polybutadiene. A solution of N-phenyl maleimide (10 g.) in tetrahydrofuran (50 ml.) was added to the "living polymer." The solutions were thoroughly mixed and polymerization allowed to proceed for 12–24 hours. The polymer was then isolated by the procedure described in Example VI.

A small amount of the sample was cast from solution and the film had the properties of a vulcanized polymer but became plastic on heating to 300° C. Its tensile strength at break was 59.5 kg./cm.$^2$ at 1800 percent elongation.

EXAMPLE VIII

This example again illustrates the way the second-order transition temperature of the elastomeric segment can be controlled and also gives an improved method for preparing the poly(ethylene sulphide) sequences.

The initiating catalyst was prepared by reacting 0.1216 g. of lithium metal dispersion (1 g. dispersion contains 0.2626 g. lithium metal) with 1.0837 g. of naphthalene in tetrahydrofuran (50 ml.) in an evacuated reactor. After stirring for 75 minutes this reaction was completed and then 2.0 ml. of thrice degassed isoprene (previously dried over a sodium mirror) was distilled in to form the initiating species, readily identifiable by its orange-yellow colour. The mixture was stirred for 70 minutes at −20° C. and was then allowed to reach room temperature, when the tetrahydrofuran solvent was removed by distillation. The residue was heated at 40° C. under high vacuum for ¾ hour.

Isoprene (32.5 ml.; 23.5 g.) was added followed by 400 ml. of purified, dried hexane and the contents were then deated at 30° C. to 40° C. with stirring. After 45 minutes viscosity increases were evident, the heating and stirring were stopped and the reaction left to proceed overnight. 250 ml. of the solvent was removed by distillation and replaced with 200 ml. of tetrahydrofuran and the polymer dissolved. The reactor and its contents were then cooled and ethylene sulphide (4.2 ml.; 4.35 g.) was distilled into it. The reactor and its contents were warmed to room temperature and stirred for ¾ hour, when the block copolymer separated as a gel. The product was removed from the reactor and leached with hexane for 24 hours with thorough agitation to extract isoprene homopolymer. This was followed by filtration of the residue, washing and drying. The yield of extracted A—B—A block copolymer was 23 g. (83 percent of theoretical yield). The experiment was repeated using different conditions, the experimental details of which are described in Table IV. The physical properties of the products are given in Table V.

The products are seen to possess good elastomeric properties at ambient temperatures. They become plastic and can be formed into different shapes above 175° C. but on cooling the above properties are again realised.

TABLE V

| EN | IIA | LD | IA | EA | %E | Y | I×10⁻³ |
|---|---|---|---|---|---|---|---|
| CP9 | 2.3 | 0.09 | 41 | 5.7 | 14.4 | 88 | 24 |
| CP10 | 2 | 0.0844 | 44.3 | 7.95 | 16.1 | 87 | 27.7 |
| CP17 | 2 | 0.1216 | 23.5 | 4.35 | 14.4 | 83 | 10.2 |

TABLE V

| EN | Tg | MP | TS | EB | 100M | 200M | HR100 | HR200 |
|---|---|---|---|---|---|---|---|---|
| CP9 | −30.6 | 180 | 45 | 650 | 6.5 | 11.1 | 98 | 97 |
| CP10 | 31.1 | 184 | 64.5 | 780 | 6.6 | | 91 | 98 | 97 |

Having now described our invention what we claim is:

1. A block copolymer having the formula $A-(B-A)_n$ wherein A is a crystalline polymer block of N-phenyl maleimide having a melting point greater than 100° C. and wherein B is an amorphous elastomeric polymer block having a glass transition temperature of up to 15° C. and a viscosity average molecular weight of 10,000 to 600,000 formed from diolefins or cyclic oxides, the total amount of said polymer block A comprising from 3% to 30% by weight of the block copolymer and wherein $n$ is an integer of from 1 to 5.

2. A block copolymer according to claim 1 wherein polymer block B is selected from the group consisting of polybutadiene and polyisoprene.

3. A block copolymer according to claim 1 wherein polymer block B is selected from the group consisting of isoprene, butadiene, propylene oxide, tetrahydrofuran and from mixtures of copolymerizable monomers selected from the group consisting of butadiene and styrene, and ethylene and propylene.

4. A block copolymer according to claim 1 in which $n$ is 1.

5. A block copolymer according to claim 1 in which the total amount of polymer block A is divided equally between two blocks.

6. A block copolymer according to claim 1 in which the total amount of polymer block A is from 10% to 20% by weight of the block copolymer.

7. A block copolymer according to claim 1 in which polymer block B has a viscosity average molecular weight of 20,000 to 200,000.

8. A block copolymer according to claim 1 in which polymer block B has a glass transition temperature below 0° C.

9. A block copolymer according to claim 1 in which polymer block B comprises a polymer of a diolefin.

10. A block copolymer according to claim 9 in which the diolefin is isoprene.

11. A block copolymer according to claim 9 in which the diolefin is butadiene.

12. A block copolymer having the formula $$A-(B-A)_n$$

wherein A is a crystalline polymer block of N-phenyl maleimide having a melting point greater than 100° C. and wherein B is an amorphous elastomeric polymer block having a glass transition temperature of below 0° C. and viscosity average molecular weight of 20,000 to 200,000 formed from polybutadiene or polyisoprene, the total amount of said polymer block B comprising from 3% to 30% by weight of the block copolymer and wherein $n$ is an integer of from 1 to 5.

References Cited

UNITED STATES PATENTS

| | | | |
|---|---|---|---|
| 3,225,120 | 12/1965 | Baker | 260—874 |
| 3,265,765 | 8/1966 | Holden et al. | 260—876 |
| 3,322,856 | 5/1967 | Holden et al. | 260—876 |
| 3,425,923 | 2/1969 | Yu | 204—159.15 |
| 3,459,832 | 8/1969 | Kern | 260—881 |
| 3,484,418 | 12/1969 | Vandenberg | 260—79 |

JAMES A. SEIDLECK, Primary Examiner

R. A. GAITHER, Assistant Examiner

U.S. Cl. X.R.

260—823, 874, 878, 887